United States Patent
Kozhukh et al.

(10) Patent No.: US 7,292,132 B1
(45) Date of Patent: Nov. 6, 2007

(54) NTC THERMISTOR PROBE

(75) Inventors: Michael Kozhukh, Palo Alto, CA (US);
Michael Shkolnikov, San Jose, CA (US)

(73) Assignee: AdSem, Inc., Palo Alto, CA (US)

( * ) Notice: Subject to any disclaimer, the term of this patent is extended or adjusted under 35 U.S.C. 154(b) by 0 days.

(21) Appl. No.: 11/014,408

(22) Filed: Dec. 15, 2004

Related U.S. Application Data

(60) Provisional application No. 60/530,326, filed on Dec. 17, 2003.

(51) Int. Cl.
*H01C 3/04* (2006.01)

(52) U.S. Cl. ............................ 338/28; 338/22 R
(58) Field of Classification Search ............... 257/467; 338/25, 28, 22 R, 308, 309, 195; 204/192.21; 29/612; 374/100; 252/519.15
See application file for complete search history.

(56) References Cited

U.S. PATENT DOCUMENTS

| | | | |
|---|---|---|---|
| 3,374,404 A | | 3/1968 | Luecke |
| 3,568,125 A | | 3/1971 | Villemant et al. |
| 3,629,585 A | * | 12/1971 | Desvignes et al. ........... 250/350 |
| 3,881,181 A | * | 4/1975 | Khajezadeh ................. 257/467 |
| 4,009,482 A | * | 2/1977 | Nakata ........................ 338/24 |
| 4,035,757 A | * | 7/1977 | Einthoven et al. ............ 338/25 |
| 4,047,436 A | * | 9/1977 | Bernard et al. ............... 338/25 |
| 4,063,210 A | * | 12/1977 | Collver ....................... 338/308 |
| 4,276,535 A | | 6/1981 | Mitsuyu et al. |
| 4,359,372 A | * | 11/1982 | Nagai et al. ........... 204/192.21 |
| 4,586,829 A | * | 5/1986 | Hubner et al. ................. 338/28 |
| 4,772,866 A | * | 9/1988 | Willens ..................... 338/22 R |
| 5,037,766 A | | 8/1991 | Wang |
| 5,141,334 A | * | 8/1992 | Castles ....................... 374/178 |
| 5,172,211 A | | 12/1992 | Godinho et al. |
| 5,183,530 A | | 2/1993 | Yamazaki |
| 5,446,437 A | * | 8/1995 | Bantien et al. ................ 338/25 |
| 5,924,996 A | * | 7/1999 | Cho et al. .................... 600/549 |
| 6,023,978 A | * | 2/2000 | Dauenhauer et al. ......... 338/42 |
| 6,077,228 A | * | 6/2000 | Schonberger ............... 600/549 |

(Continued)

OTHER PUBLICATIONS

Wolf, Stanley, et al, "Silicon Processing for the VLSI Era," vol. 1, Second Edition, copyright 2000, Lattice Press, pp. 5-28.
U.S. Appl. No. 10/846,055, Office Action dated Aug. 18, 2006, 7 pages.
U.S. Appl. No. 10/846,055, Final Office Action dated Jan. 23, 2007, 11 pages.
U.S. Appl. No. 10/846,055, Notice of Allowance dated Apr. 19, 2007, 7 pages.

*Primary Examiner*—Richard K. Lee
(74) *Attorney, Agent, or Firm*—Blakely, Sokoloff, Taylor & Zafman

(57) ABSTRACT

An apparatus for temperature measurement comprising at least one insulator, at least one thermistor attached to the insulator, the thermistor having at least one of a Ge NTC die and an Si NTC die, and at least one outer electrically conductive film attached to the insulator and electrically coupled to the thermistor.

21 Claims, 7 Drawing Sheets

Thermistor probe with thermistor 1

U.S. PATENT DOCUMENTS

| | | |
|---|---|---|
| 6,122,704 A * | 9/2000 | Hass et al. .................. 711/100 |
| 6,316,770 B1 * | 11/2001 | Ouvrier-Buffet et al. ....................... 250/338.1 |
| 6,319,429 B1 * | 11/2001 | Moos et al. ........... 252/519.15 |
| 6,354,736 B1 * | 3/2002 | Cole et al. ................ 338/22 R |
| 6,380,840 B1 * | 4/2002 | Wienand et al. .............. 338/25 |
| 6,433,666 B1 * | 8/2002 | Inoue et al. .............. 338/22 R |
| 6,744,346 B1 * | 6/2004 | Akram et al. ................. 338/25 |
| 2002/0179992 A1 * | 12/2002 | Parsons ...................... 257/467 |

* cited by examiner

Fig. 1. Thermistor probe with thermistor 1

Fig.2. Thermistor probe for temperature measurement at two points. The probe has two external copper layers (3,4), and one internal copper layer 5.

Fig.3. Thermistor probe for temperature measurement at two points. The probe has two surface copper layers (3,4) and two separated internal copper layers (5,6).

Fig.4. Stripe shape thermistor probe with two surface mount thermistors placed at two locations Fig. 5. Disc shape thermistor probe

NTC THERMISTOR PROBE

PRIORITY

This is a U.S. patent application that claims priority under the provisional U.S. patent application Ser. No. 60/530,326, filed on Dec. 17, 2003.

BACKGROUND OF THE INVENTION

1. Field of the Invention

The present invention relates to the field of temperature measurements and can be employed in various temperature measuring devices utilizing semiconductor and/or ceramic thermistors with positive and/or negative temperature coefficients.

2. Discussion of the Background Art

Available thermistor probes consist of ceramic thermistors with leads that are covered by a metal or plastic tube having a diameter in the range of (4–7) mm and a length of up to 30 cm. The tube is placed in an area in which temperature is to be measured, and the thermistor inside of the tube measures temperature outside of the tube with some delay in time due to a temperature gradient between a real environment temperature and the thermistor temperature inside the tube. The internal volume of the tube is large enough to accommodate a ceramic thermistor, with two wires, encapsulated in epoxy or glass. The tube separates the thermistor from an environment outside of the tube. The main purpose of placing a ceramic thermistor inside of the tube is to prevent direct contact with a potentially hostile surrounding environment since ceramic thermistors easily absorb water vapor that adversely affects the thermistor performance. Such thermistor probes have a number of disadvantages.

In prior art thermistor probes, the thermistor body is isolated inside a metal tubing far enough from the point of temperature measurement to create a temperature gradient between thermistor and media outside the tube. The probes are also not designed for monitoring temperature at multiple points with two or more thermistors. Furthermore, it is impossible to use such probes for temperature measurements in the presence of microwave radiation because of intensive RF absorption by the massive metal tube and metal wires. It is nearly impossible to use these probes to measure temperature at locations that are hard to reach. Finally, the production cost of such thermistor probes is relatively high.

SUMMARY OF THE INVENTION

To address the shortcomings of the available art, the present invention provides an apparatus for temperature measurement comprising an insulator, at least one thermistor attached to the insulator, the thermistor having at least one of a Ge NTC die and an Si NTC die, and at least one outer electrically conductive film attached to the insulator and electrically coupled to the thermistor.

BRIEF DESCRIPTION OF DRAWINGS

The aforementioned advantages of the present invention, as well as additional advantages, will be more clearly understood with reference to the following drawings.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail so as not to unnecessarily obscure aspects of the present invention.

A number of diverse high temperature insulator materials can be used as a probe material. Such high temperature insulator materials have a working temperature of more than 100° C. and include, for example, PC Board, prepreg, polyimide, ceramic, quartz, Teflon, Sic, and diamond. The high temperature insulator materials are coated with thin conductive (metal) films on one or both sides, or with a number of thin metal films inside of the insulator. One or both opposite surfaces of the insulator are coated with an electrically conductive thin metal film comprising one or a combination of copper, nickel, tin, and gold, and having a thickness of 1–200 um. Such solid-state insulator plates with metal films (or flexible insulators with conductive lines) can have a width of 3–5 mm and a length of up to a few meters and more. Insulators with a total of three, four and more metal layers, some of which can be inside of the insulator body, can also be used for thermistor probes.

Si and Ge thermistors are stable. Such thermistors do not absorb water, while ceramic thermistors do, and they can be placed as blank dies inside and/or on the surface of multilayer solid-state probes of the present invention. Additionally, surface mounted Si and/or Ge thermistors (SMT) can be industrially produced in micro packages. Because Si and Ge thermistor packaging is compatible with the microelectronic packaging industry, differentiating them from any ceramic thermistors, they can be packaged in various standard semiconductor/microelectronic packages such as, for example, SC79, SOD323, 6SLP, or SCD0805. Such microelectronically packaged Si and Ge thermistors can be mounted on the surface of solid (eg. PC Board) or flexible (eg. Flex) insulators at specially designed contact places that are connected to conductive lines or wires made by photolithography and etching.

Figure 1:
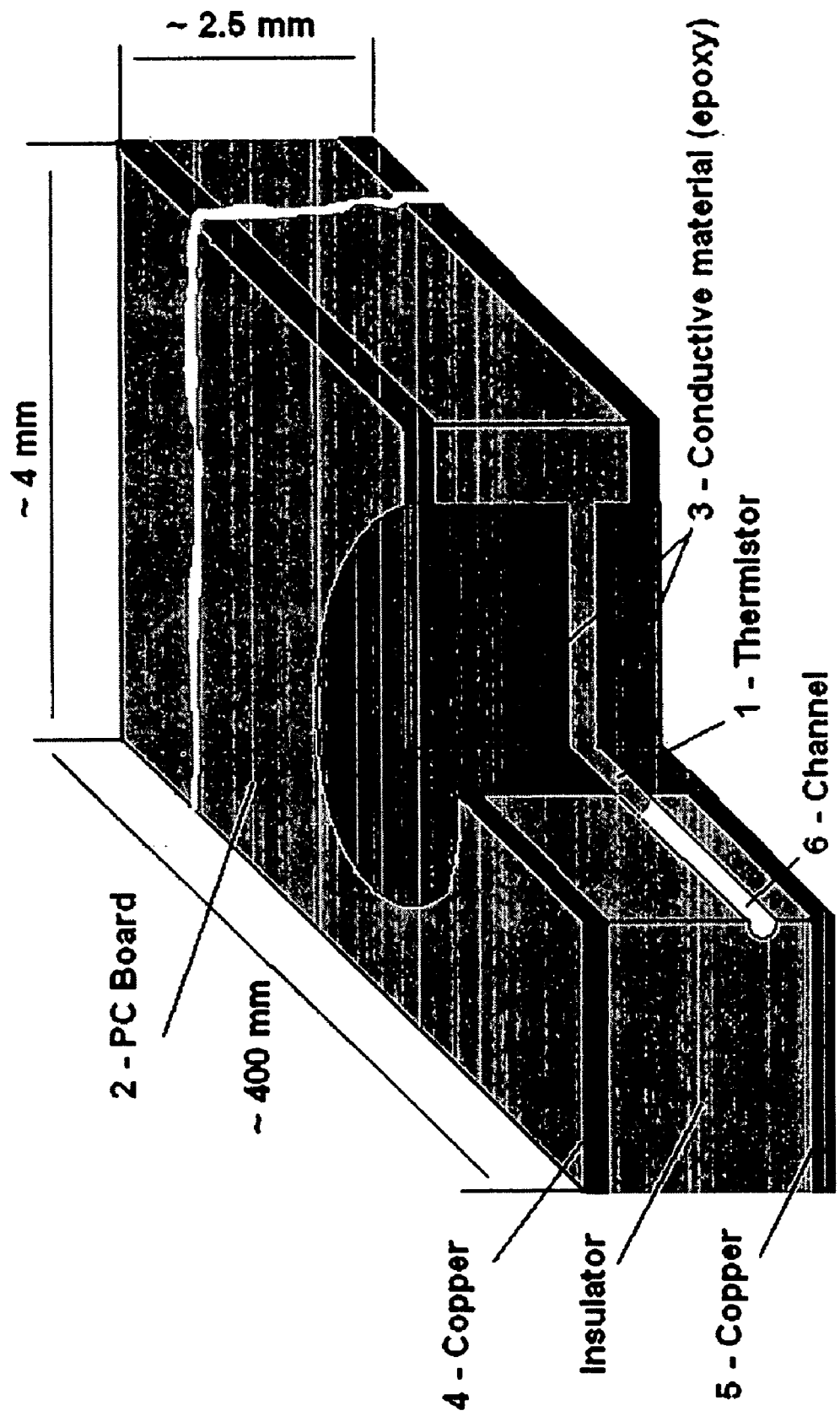
FIG. 1 is a plan view showing a thermistor probe in which an unpackaged Si or Ge NTC thermistor die 1 with two metallic ohmic contacts on both sides is placed inside a PC Board.

FIGS. 1–7 show a number of proposed thermistor probes with different designs. FIG. 1 shows a plan view of the design of a thermistor probe 1, in which an unpackaged Si or Ge NTC thermistor die 2 with two metallic ohmic contacts (not shown) on both sides is placed inside PC Board 4. The illustrated PC Board 4 has a thickness of about 2.5 mm, a width about 4 mm, and a length about 40 cm. Both thermistor metal ohmic contacts are connected by conductive epoxy 6 to the proper copper films 9 and 11 on both sides of the PC Board 4. Thus, copper films 9 and 11 work as wire leads, connecting the thermistor 2 with an electrical measuring circuit (not shown). Their width can be minimized by undergoing a photolithography process and etching down to a few microns. In the proposed design, the thermistor probe 1 has copper films with a thickness of only about a hundred microns, and silver (as a conductive epoxy 6) between the thermistor 2 and its surrounding environment. Thus, both the thermistor response time to temperature changes and the temperature gradient between an environment and the thermistor decrease. An additional channel 13 can be used to additionally reduce response time.

Figure 2:
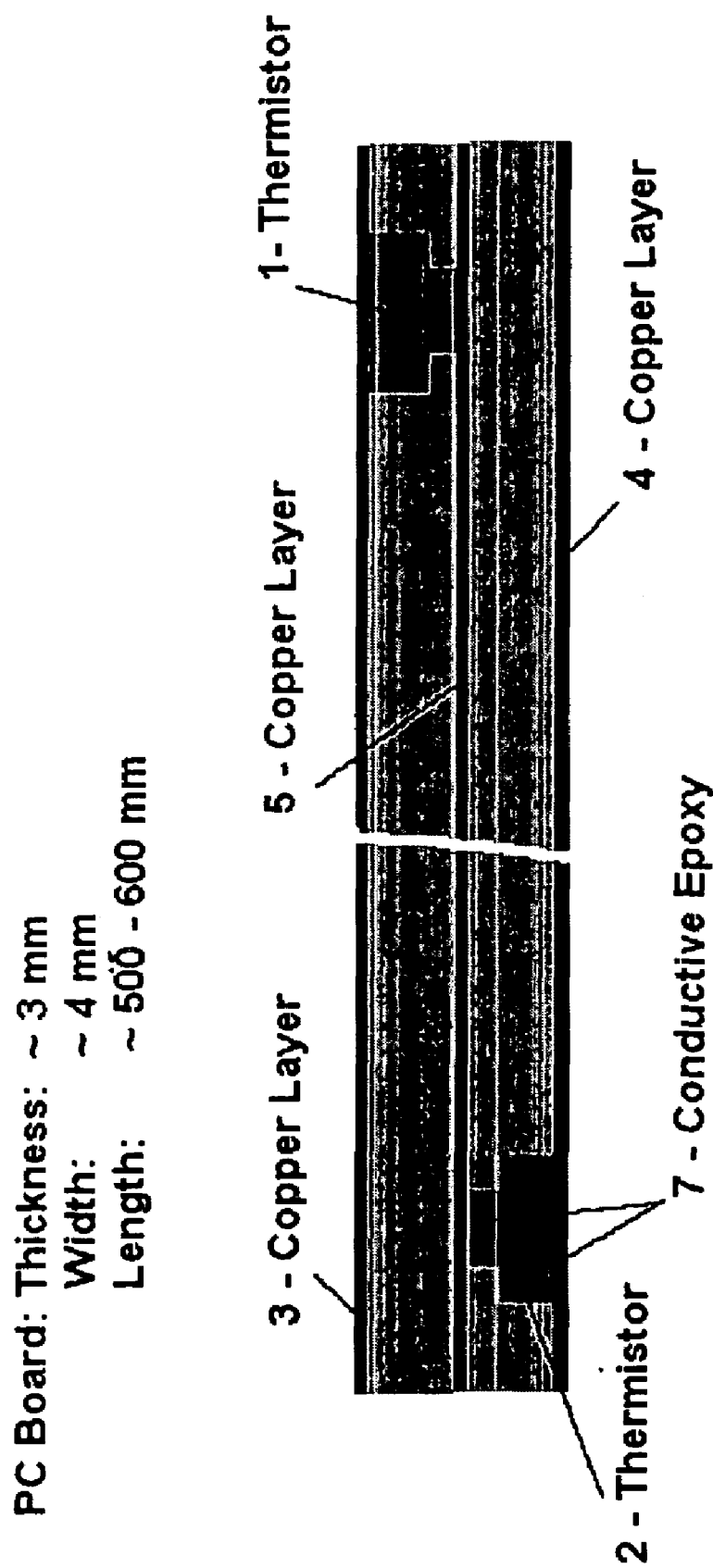
FIG. 2 is a cross-sectional view of a thermistor probe having two thermistors at different locations inside a PC Board.
Figure 3:
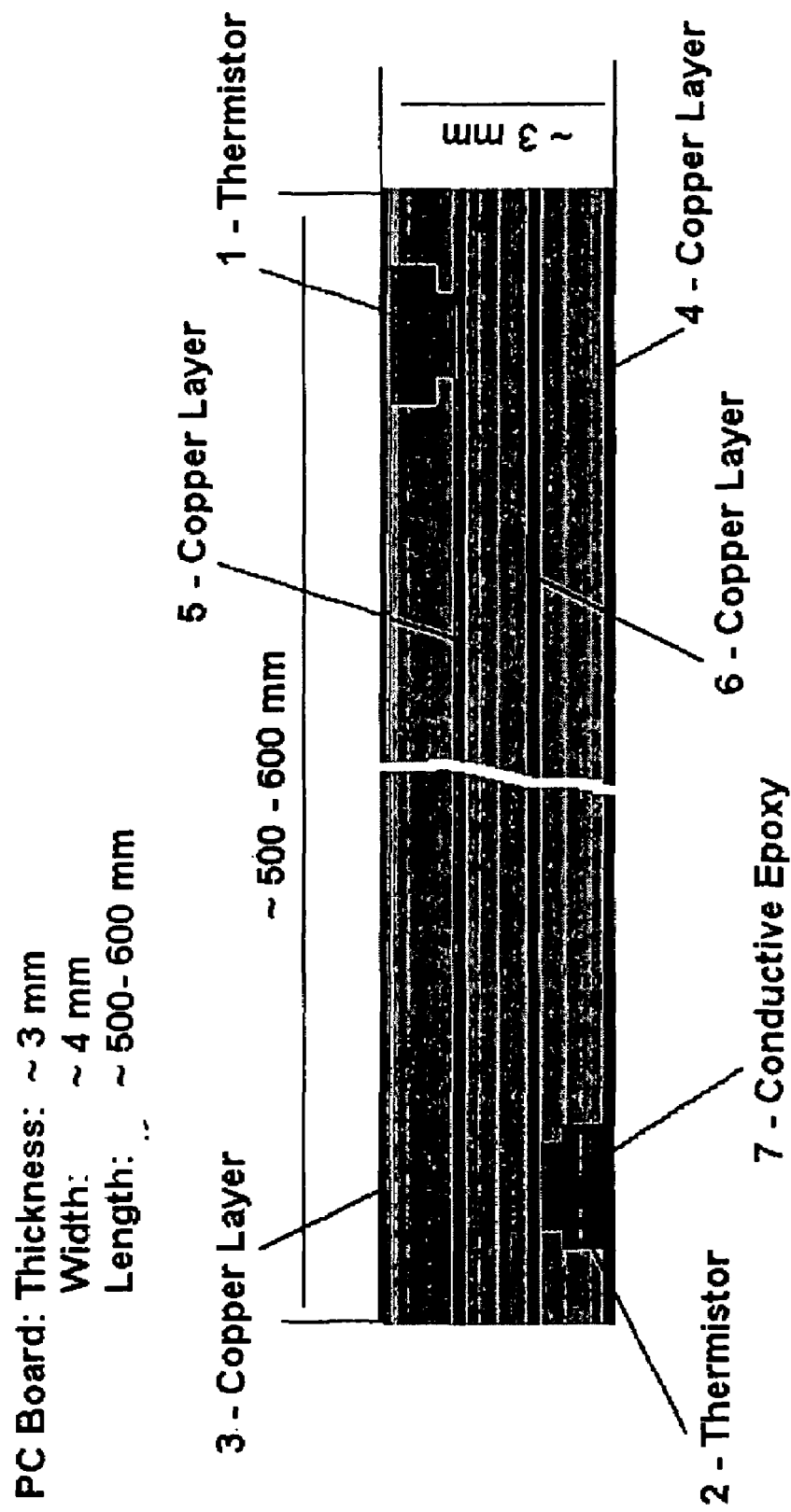
FIG. 3 is a cross-sectional view of a thermistor probe having two thermistors at different locations inside a PC Board.

FIGS. 2 and 3 depict two "two in one" solid state probes, each of which contains two thermistors 2 and 16 at different locations inside a PC Board, allowing simultaneous temperature measurement at two points located along the probe. The probe 15 of FIG. 2 has three conductive (for example, copper) layers: two layers 17 and 18 on the opposite sides of the probe and layer 19 inside the insulator (PC Board) 4 in parallel with layers 17 and 18. All three layers 17, 18 and 19 work as wire leads, connecting thermistors 2 and 16 with a measuring circuit (not shown). There are two separate leads or copper films, one to each thermistor, and one common electrical contact (internal copper layer) that is shared by both thermistors. The probe 20 of FIG. 3 is designed with four layers of copper: two surface copper layers 17 and 18, and two separated copper layers 19 and 21 inside dielectric 22. In this design, each of two thermistors is connected by conductive epoxy 6 to one of the surface copper layers 17 and 18 and one of the internal separated copper layers 19 and 21. They are insulated from each other.

Figure 4:
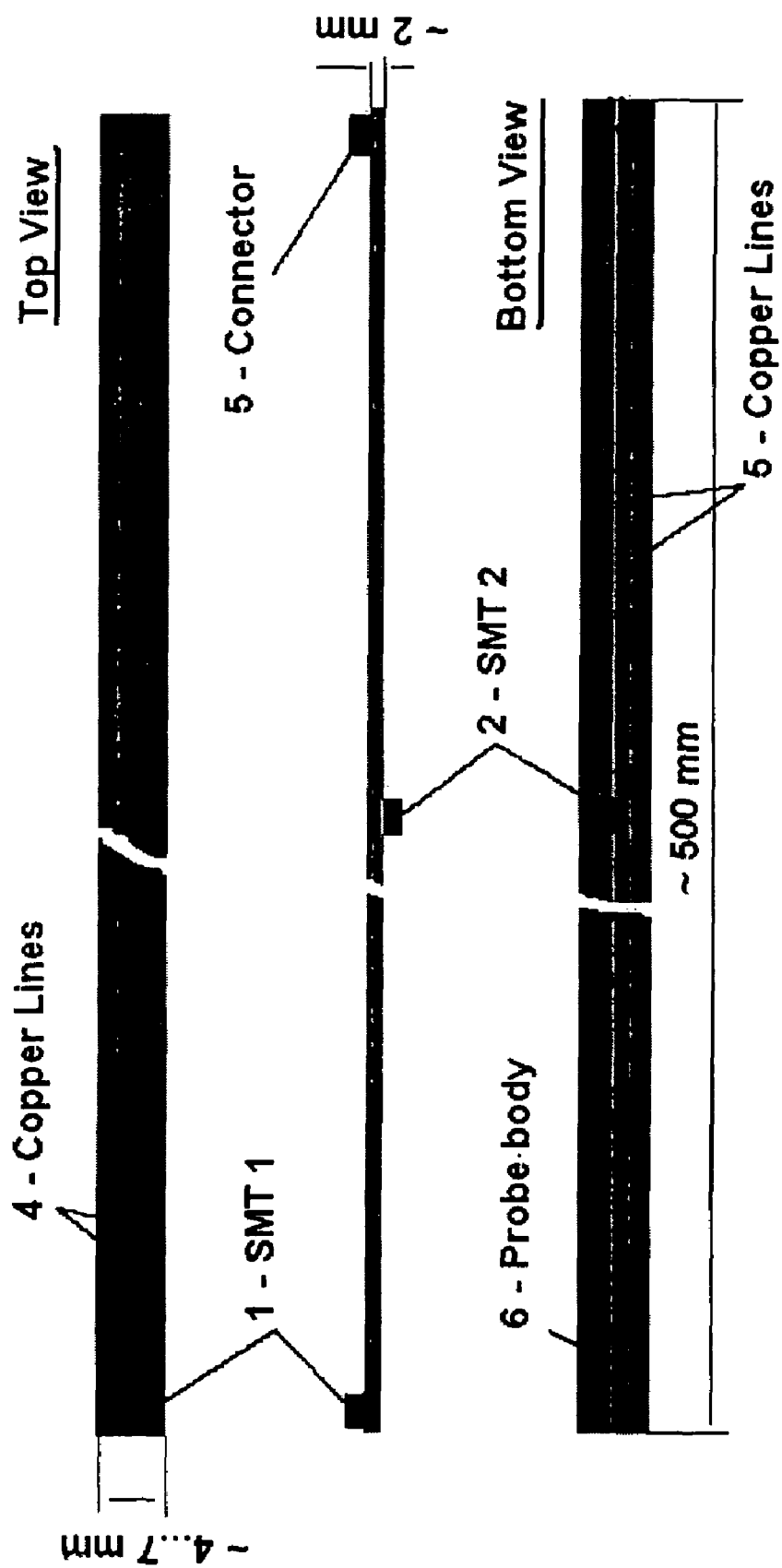
FIG. 4 illustrates a top view, side view, and bottom view of a thermistor probe in which one or more Si or Ge SMT type thermistors are placed on one or both surfaces of a PCBoard.
Figure 5:
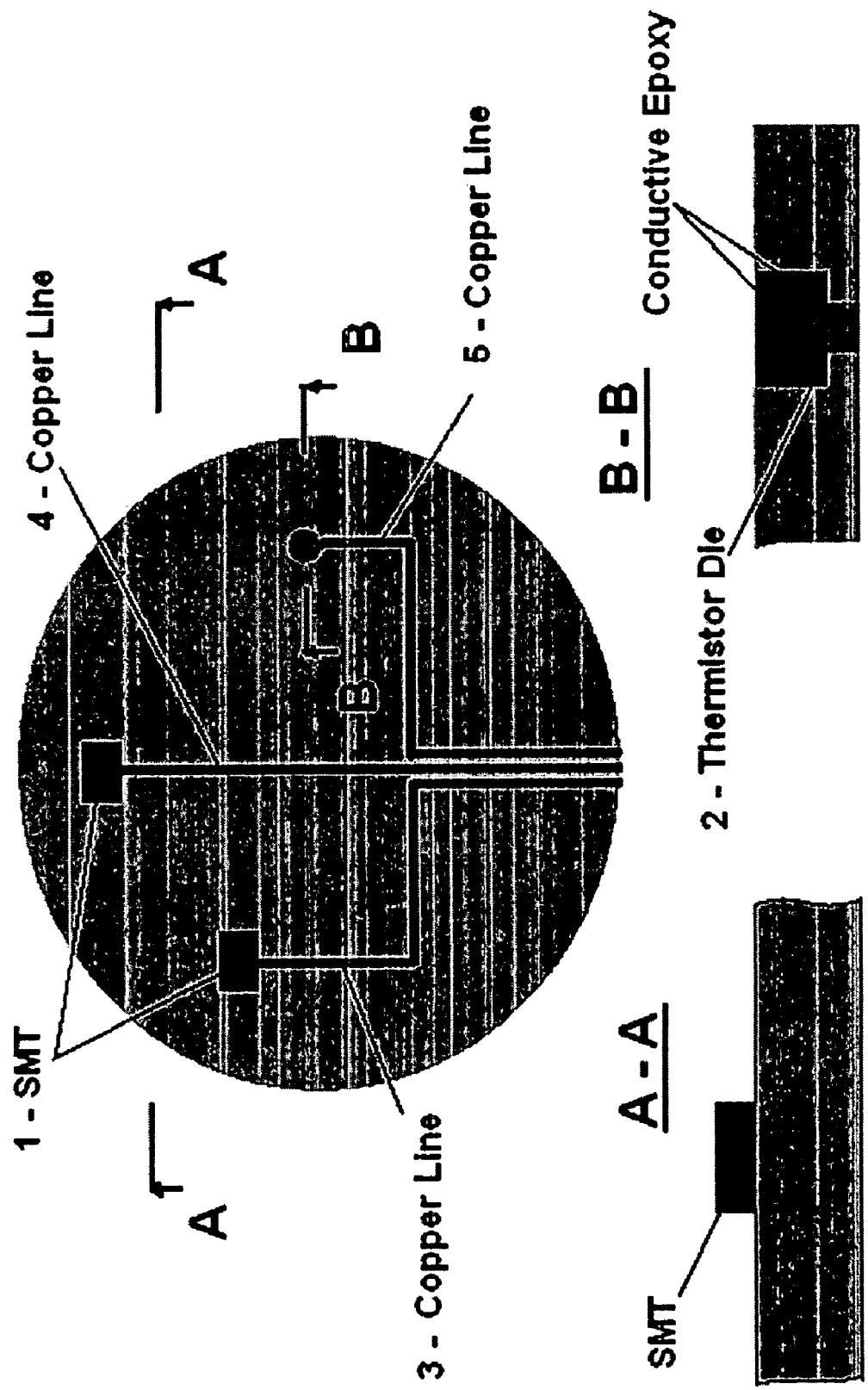
FIG. 5 illustrates a top view and two cross-sectional views of a thermistor probe in which one or more Si or Ge SMT type thermistors are placed on one or both surfaces of a PCBoard.
Figure 6:
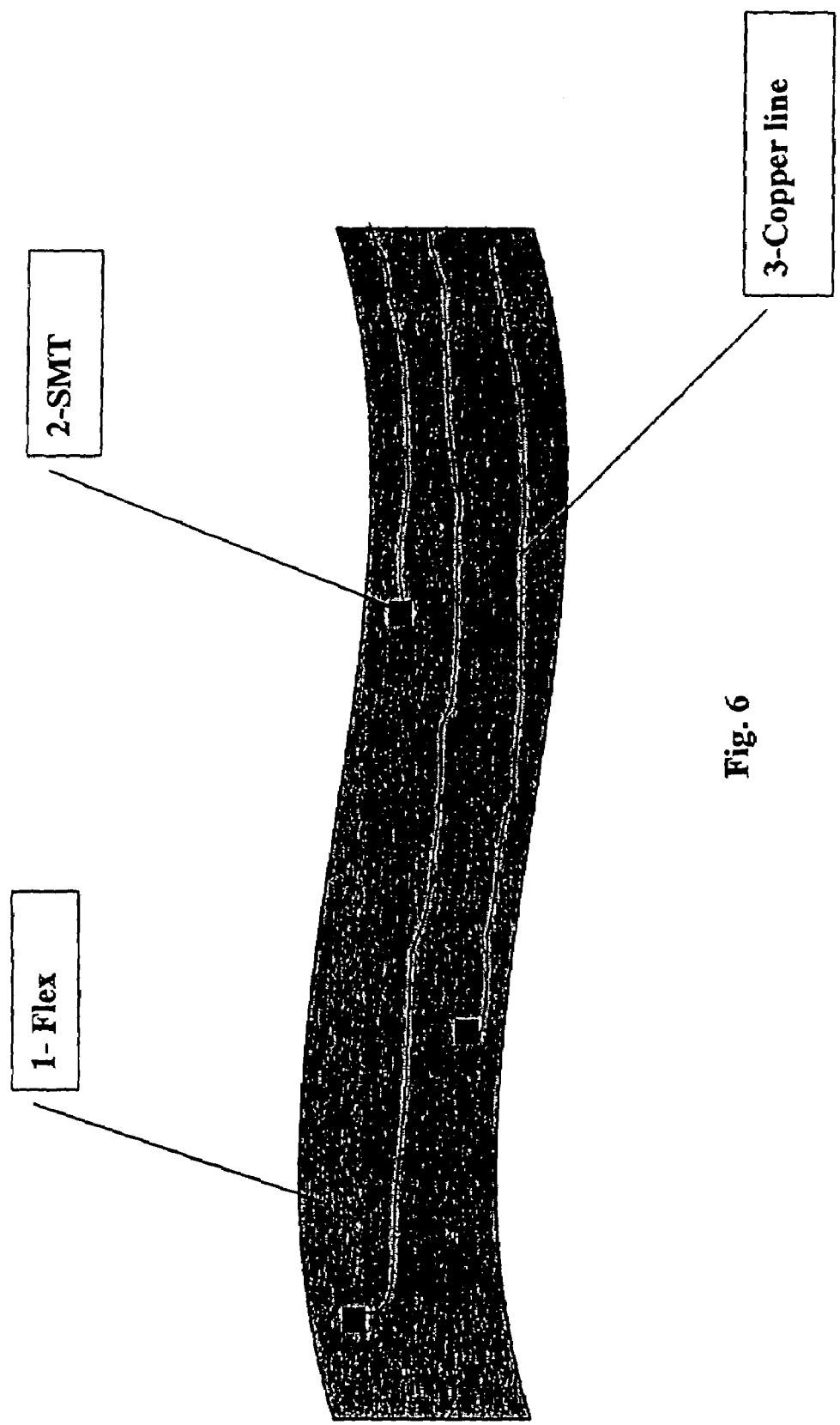
FIG. 6 illustrates a top view of a thermistor probe that is implemented with a very thin flexible nonconductive substrate like Flex with 100–200 um thickness and with two thin copper layers on each side of the Flex.

FIGS. 4 and 5 show thermistor probe designs in which one, two, or more Si or Ge SMT type thermistors 2 and 16 are placed on one or both surfaces of a PCBoard. Packaged SM ceramic thermistors can also be employed. Each thermistor is connected to copper lines 25 and 30, which can be pre-manufactured by photolithography and etching. All copper lines 25 and 30 (or other metal lines) are insulated from each other and are connected independently to the measuring circuits for resistance (temperature) measurements. Thus, placing a number of SMT on the electrically insulated thermistor probe body 23 allows measuring space temperature distribution within the probe surface. The probe 31 of FIG. 5 shows a disc shape, and is made from a dielectric such as ceramics, or Si with an $SiO_2$ coating. The probe may have, for example, two SMT(s) 2 and 16 and a die thermistor 34 located inside the probe body. Each thermistor is connected to the measuring circuit by copper lines 37, 39 and 42, which are pre-manufactured by photolithography and etching. These probes can be placed on a testing surface to measure temperature at multiple points, or in a tube to measure space temperature distribution. A similar design can be also be implemented for very thin flexible nonconductive substrates like Flex. FIG. 6 shows a flexible nonconductive substrate 44 with a 100–200 um thickness and with two thin copper layers, one on each side of the flexible nonconductive substrate (Flex) 44.

A number of SMT thermistors 46 can be placed on a high temperature Flex surface, which has a thermos table up to 250° C. The Flex surface can be developed by photolithography and etching to etch insulated Cu micro lines 48. Note that there are separate electrical connections for each thermistor. Thus, it is possible to make a compact and simple temperature measuring system with flexible connectors. With the practically unlimited length that such a design allows (even up to a few meters), such systems can deliver numerous thermistors into small inconvenient areas to conduct temperature measurements and explore temperature distribution. Additionally, the use of Flex for thermistor probes (substrates) opens an opportunity for development of industrial technology for production of the smallest Si and/or Ge thermistors. Such thermistors can have a cross section of about 100×100 $um^2$.

Figure 7:
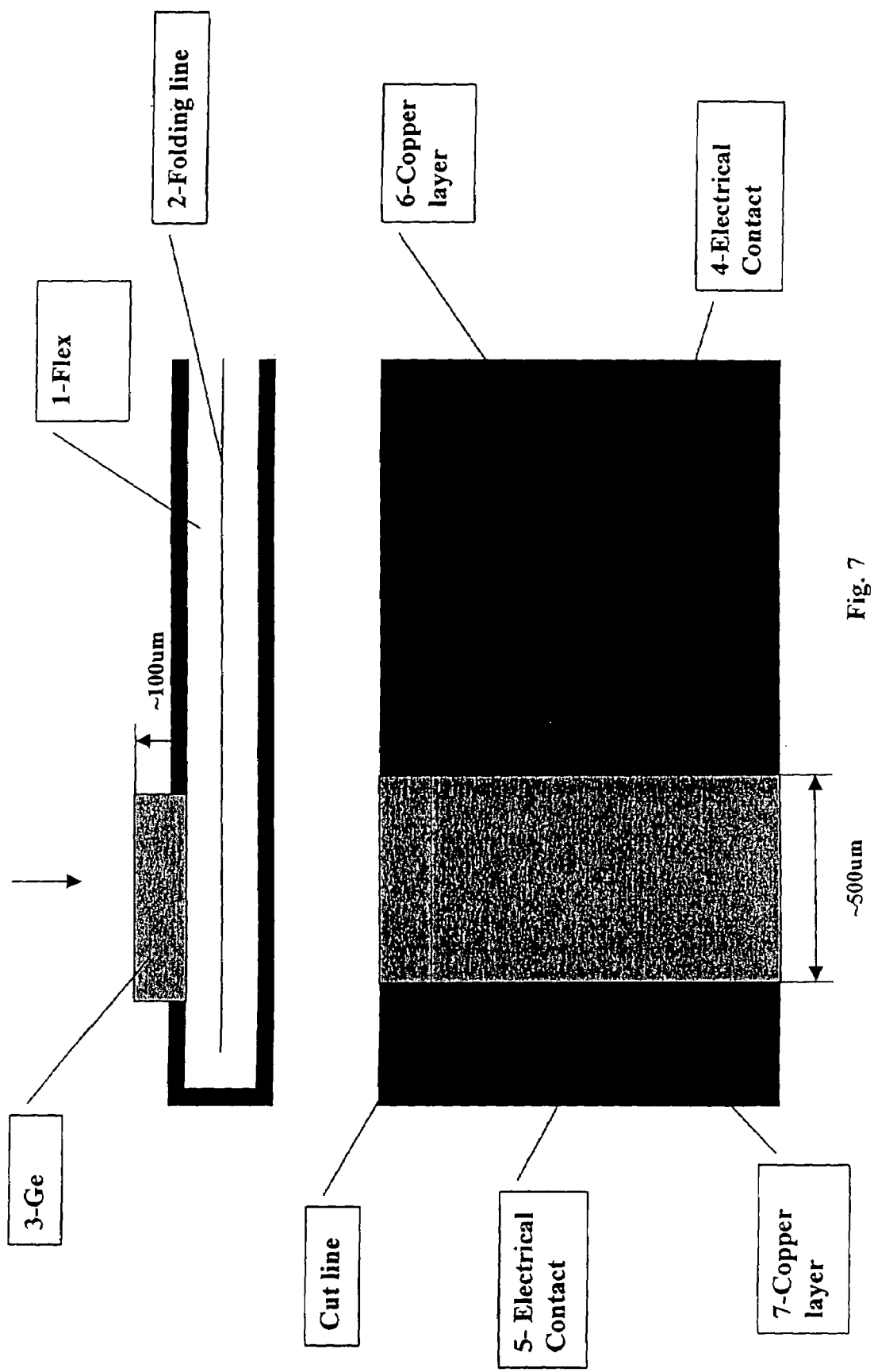
FIG. 7 shows a top view and a cross sectional view of an embodiment of the present invention including a flexible material that is used to provide ohmic contacts to an NTC element.

FIG. 7 shows a top view and a cross sectional view of an embodiment of the present invention including a flexible material that is used to provide ohmic contacts to an NTC element. To implement a thermistor probe having a Flex surface, one should take a Flex 44 strip with a total thickness of about 50 um, and coat one side with a copper layer 9 and 11. Then fold the Flex strip in half so that the copper layer 9 and 11 lies on the outside surface, and take off a stripe of Cu on one of the Flex 44 sides using lithography and etching techniques. Subsequently, attach a piece of about 100 um thick Ge 51, having metal ohmic contacts on opposite sides (not shown), to the insulator Flex 44 surface where the copper layers 9 and 11 was removed to form electrical contacts 55 and 60 between the Ge 51 and copper layers 9 and 11 by soldering or using conductive epoxy. Finally, slice the Flex 44 with attached Ge 51 piece on the stripes to a width of about 100 um with a diamond tool.

One will produce a thermistor with a cross section of 100×100 $um^2$ with copper "wires" separated by the thin insulator (Flex). In one embodiment, the probe has the ability to measure temperature in an RF radiation field (for example a microwave furnace), and has a high resistance Si die as a thermistor body, the Si die having a size in the range of 100–250 um in order to decrease RF absorption. Using a one side copper coated PC Board as a probe material, it is possible to produce copper leads (lines) on the PC Board surface with a width in range of 20–50 um employing photolithography and etching. This will greatly decrease direct absorption of RF in the leads.

Thus, development of the above described solid state thermistor probes and substrates allows one to measure not only a temperature at some location, but also a temperature distribution in space along the probe. The thermistor probes of the present invention also allow for an accelerated thermistor response, a decreased temperature gradient between environment and thermistor, and a simplified production process and decreased production cost. It is also possible to produce the smallest semiconductor thermistors for medicine, for example, and probes suitable to work under RF field radiation.

The foregoing description of specific embodiments of the present invention have been presented for purposes of illustration and description. They are not intended to be exhaustive nor to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. Therefore, it is intended that the scope of the invention be defined by the claims appended hereto and their equivalents, rather than by the foregoing description. All changes which come within the meaning and range of equivalency of the claims are to be embraced within their scope.

What is claimed is:

1. A probe comprising:
   an insulator;
   two or more thermistors with thicknesses of at least 100 um attached to different locations of the insulator for decreasing RF absorption, each of the two or more thermistors having at least one of a Ge NTC die and an Si NTC die, wherein at least one of the two or more thermistors, when operating to measure temperature of a surrounding environment, is in direct thermal contact with the surrounding environment;
   a first surface metal layer on a first surface of the insulator;
   a second surface metal layer on a second surface of the insulator; and
   at least one inner metal layer embedded within the insulator.

2. A probe comprising:
   an insulator, capable of operation at high temperature;
   at least one thermistor with a thickness of at least 100 um attached to the insulator for decreasing RF absorption, the thermistor having at least one of a Ge NTC die and an Si NTC die, wherein the at least one thermistor, when operating to measure temperature of a surrounding environment, is in direct thermal contact with the surrounding environment; and
   at least one outer electrically conductive film attached to the insulator and electrically coupled with the thermistor.

3. The probe of claim 2, wherein the insulator is an inflexible insulator that operates at high temperature comprising at least one of a prepreg, polyimide, ceramic, quartz, teflon, SiC, and diamond.

4. The probe of claim 2, wherein the insulator is a flexible insulator.

5. The probe of claim 4, wherein the flexible insulator operates at high temperatures and comprises at least one of polyimide and Teflon.

6. The probe of claim 2, further comprising:
   at least one inner electrically conductive layer inside the insulator.

7. The probe of claim 6, wherein the at least one inner electrically conductive layer comprises a plurality of inner electrically conductive layers, each of the plurality of inner electrically conductive layers being electrically separated by the insulator.

8. The probe of claim 6, wherein the at least one inner electrically conductive layer and at least one outer electrically conductive film each comprises at least one of copper, nickel, tin, and gold.

9. The probe of claim 6, wherein the at least one thermistor comprises a plurality of semiconductor NTC thermistors.

10. The probe of claim 2, wherein the at least one outer electrically conductive film coats at least one of a first surface of the insulator and a second surface of the insulator.

11. The probe of claim 2, wherein the at least one outer electrically conductive film is a metal film that has a thickness between about 0.1–1,000 microns.

12. The probe of claim 2, wherein each of the at least one outer electrically conductive film is a conductive line having a width of about 20 microns to about 5 mm.

13. The probe of claim 2, wherein the at least one thermistor is fully enclosed within the insulator.

14. The probe of claim 13, wherein the at least one thermistor is mounted on a surface of the insulator.

15. The probe of claim 14, wherein the at least one thermistor is packaged as a device in a surface mounted package.

16. The probe of claim 2, wherein the at least one thermistor is connected to the at least one conductive film by a conductive epoxy.

17. The probe of claim 2, further comprising:
   a measuring circuit connected to the at least one outer conductive film.

18. The probe of claim 2, wherein:
   the at least one thermistor comprises a thermistor body with a high resistance NTC Silicon die.

19. The probe of claim 1, wherein the two or more thermistors comprise:
   a first semiconductor NTC thermistor connected to the first surface metal layer and the at least one inner metal layer; and
   a second semiconductor NTC thermistor connected to the second surface metal layer and the at least one inner metal layer.

20. The probe of claim 19, wherein:
   the at least one inner metal layer comprises a first inner metal layer and a second inner metal layer;
   the first semiconductor NTC thermistor is connected to the first surface metal layer and the first inner metal layer; and
   the second semiconductor NTC thermistor is connected to the second surface metal layer and the second inner metal layer.

21. The probe of claim 1, wherein the at least one inner metal layer is electrically isolated from the first surface metal layer and the second surface metal layer.

* * * * *